United States Patent Office 2,778,453
Patented Jan. 22, 1957

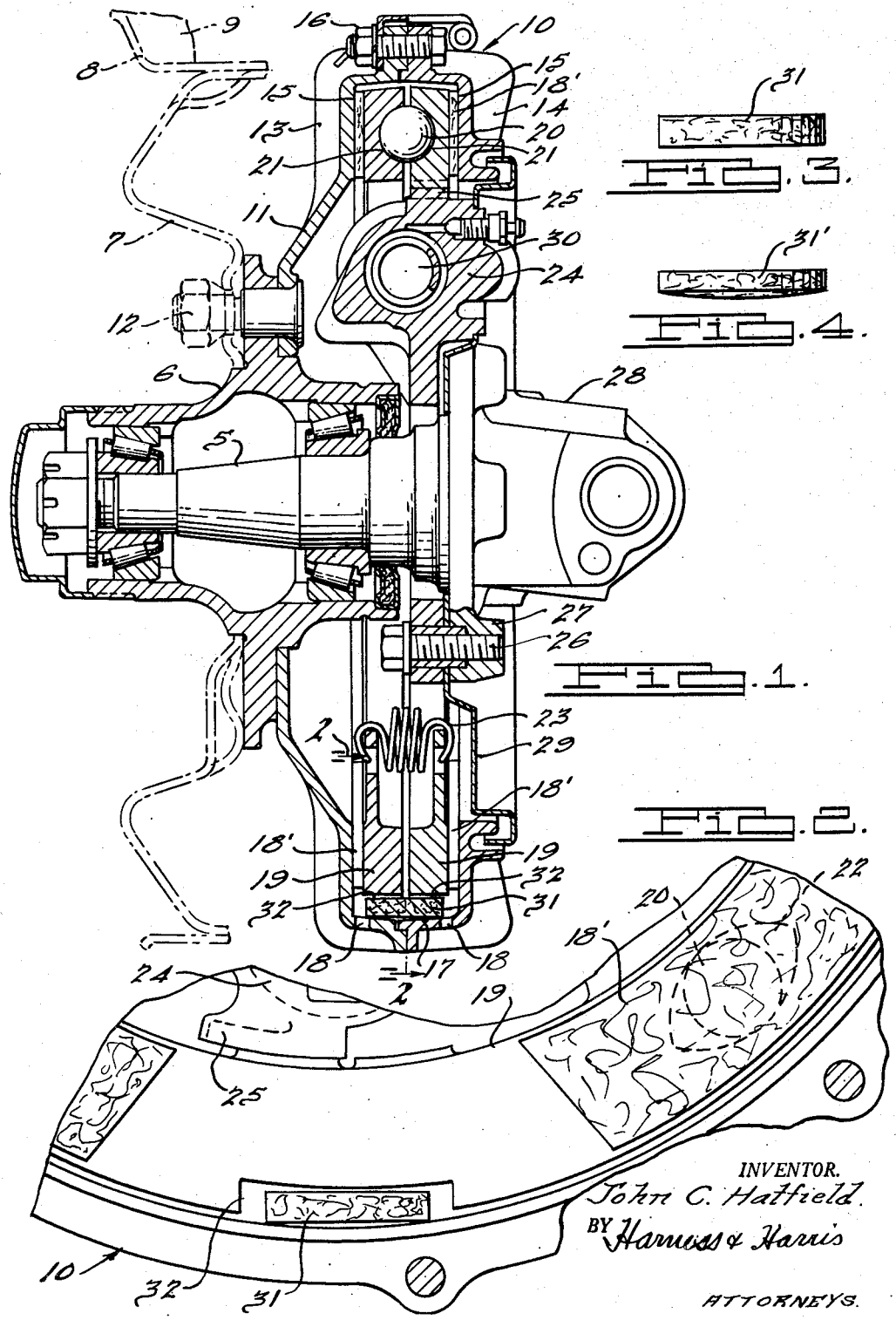

2,778,453

BRAKE

John C. Hatfield, Lake Orion, Mich., assignor to Chrysler Corporation, Highland Park, Mich., a corporation of Delaware Application January 16, 1953, Serial No. 331,703

6 Claims. (Cl. 188—73)

This invention relates to improvements in brakes and more particularly to a brake of the type for the road wheel of a motor vehicle although the invention in its broad aspects is not limited thereto.

The main object of the invention is to improve the operation of a brake by removing therefrom dust and particles which are eroded from the engaged friction surfaces as an incident to brake operation or which otherwise gain access to the brake, and an object of the invention includes preventing the collection of dust and particles, regardless of origin, in a manner to adversely affect the efficient and uniform operation of the brake.

A further object of the invention is to effect removal of dust and particles from a brake without resort to relatively expensive mechanism of the type to direct air currents to the interior of an enclosed brake for evacuating dust and particles therefrom. Instead, the invention provides a simple and inexpensive but efficient scraper or duster which can be positioned entirely within a wheel brake housing to be braked and which will direct dust and particles to suitable outlets in such housing for discharge therefrom.

By way of example and not limitation, the invention is applicable to a brake of the disc type which includes an annular housing rotatable with a vehicle road wheel and substantially channel-shaped in radial cross-section. Two braking members engage internal wall surfaces of the housing to effect the braking action and are actuated by camming means therebetween, generally including balls acting on camming rams of the braking members. In removing dust and particles eroded from the friction surfaces and which would otherwise clog the balls and camming ramps, the invention provides a scraper or duster for an internal surface of the housing to which centrifugal force, developed by rotation of the housing, would direct eroded dust and particles; and to provide a scraper or duster which is restrained against rotation with the housing by the braking members and which is so contoured as to direct the scrappage to suitable outlets in the housing leading from the surface scraped or dusted.

Other objects and advantages of the invention will be more apparent from the embodiment in the accompanying drawings, in which:

Fig. 1 is an elevational view, mainly in section, of a brake embodying the invention;

Fig. 2 is an enlarged fragmentary view taken approximately on the line 2—2 of Fig. 1, parts being broken away to show the underlying structure;

Fig. 3 is a side elevational view of the duster or scraper shown in Figs. 1 and 2;

Fig. 4 is a view similar to Fig. 3 but showing a modified duster or scraper.

Referring to the drawings, the invention is llustrated and described in a vehicle road wheel of the steerable type but it is also similarly applicable to a driving wheel. The wheel is mounted on a spindle 5 movable to effect steering and includes a hub 6 journalled on the spindle, a disc 7 and a rim 8 secured thereto and on which a tire 9 is mounted. An annular brake housing 10 has an inwardly extending flange 11 and this flange and the disc 7 are bolted as at 12 to the hub 6. The housing 10 includes two segments 13 and 14 each provided with an internal, annular friction face 15 axially opposite such face of the other, the segments being bolted together as at 16. The housing has an annular internal surface 17 which extends axially between the friction faces 15 and has a radius of curvature axially. Each segment 13, 14 is provided with a plurality of circumferentially spaced outlet openings, one of which is shown at 18, which lead radially outwardly from the surface 17 at a location immediately adjacent the friction 15 of a respective segment.

A pair of ring-like brake members 19, commonly referred to as discs, are positioned in the housing 10 for engagement with a respective friction face 15, and each member has a friction lining 18, preferably in segments bonded thereto, for contact with the cooperating friction face. A plurality of circumferentially spaced balls are disposed between the members 19 and are respectively received in registering recesses or pockets in such members, a typical ball 20 being shown in the recesses or pockets 21 in each member 19. A camming ramp extends circumferentially from each recess, a typical ramp being shown at 22. Springs, one shown at 23, bias the members 19 together against the balls 20 but will yield to accommodate relative movement between members 19.

The inboard member 19, as viewed in Fig. 1, is piloted on a pair of diametrically arranged wheel cylinders, one of which is shown at 24 and for such piloting each cylinder 24 has a pad as shown at 25. The other or outboard member 19 is supported by the ball and recess arrangement and the biasing of springs 23. Each cylinder is bolted as at 26 to a flange 27 of the knuckle support 28 and a cover plate 29 for the inboard side of the housing 10 is also secured in place by the bolting at 26. For a driving, non-steerable road wheel, the flange 27 is provided by the axle housing.

Fluid under pressure, from any suitable source, is admitted to each cylinder 24 between axially spaced pistons therein, one such piston being shown at 30, to axially oppositely move the pistons and the pistons respectively act on the braking members 19 to rotate one in one direction and the other in a second direction. As a result of this relative rotation of members 19 the balls 20 ride on the associated ramps 22 to spread the members 19 axially into braking engagement with a respective friction face 15 of the housing 10. Dust and particles are eroded from the frictionally engaged faces of the lining 18 and housing surfaces 15 and this eroded matter causes erratic and non-uniform operation of the brake. The centrifugal force induced by rotation of the housing 10 directs eroded dust and particles, as well as other foreign matter which may gain access to the housing, outwardly to the surface 17 where it will tend to collect, particularly in the presence of a relatively moist atmosphere. A severe shock to the housing will loosen the collected material from surface 17 and some part thereof will enter the space between members 19 and clog the balls 20 and ramps 22. When so clogged the normal action of the balls and ramps is hindered to an extent to cause erratic brake operation. The foregoing is one instance of the adverse results produced by dust and particles, it being understood that other specific interferences result including the heat insulation provided thereby which adversely affects dissipation of heat generated by the braking action.

For removing and preventing the collection of foreign matter as aforesaid at the surface 17, the invention provides a duster or scraper 31 for such surface. This scraper is preferably a flat circular plate or disk and is formed from a stock of friction material commonly used for brake linings. The flat plate makes for economical manufacture and the material selected should have good wearing characteristics and should be non-metallic to prevent objectionable noise incident to contact with the metallic discs 19 and housing 10. Each disc 19 has a recess in the outer periphery thereof axially registering the recess of the other disc, a typical recess being shown at 32. Each such recess has a circumferential dimension sufficiently greater than the diameter of disk 31 to accommodate the requisite relative rotation of the braking disc 19 to the maximum extent during the life of the friction lining of the discs 19.

The circular contour of the duster or scraper 31 directs scrappage from the surface 17 axially outwardly to each series of openings 18 for the discharge therethrough to the exterior of the housing 10. The scraper 31 in effect floats in the recesses 32 and regardless of its bodily rotative position, for example, always presents a circular scraping surface to the housing surface 17. The lower peripheral surface, as viewed in Fig. 2, of the disk 31 will undergo wear through contact with the housing and as a result this surface will present a bevel contour such that after wear the disk 31 will be generally similar in contour to the disk 31' of Fig. 4. It will be understood that if desired the disk 31 can be formed originally to the contour illustrated in Fig. 4.

In operation of the brake the housing 10 rotates with the vehicle road wheel and the scraper 31, 31' is rotatably stationary except for the movement permitted by the relatively larger recesses 32. Thus, the housing 10 in effect rotates relative to the scraper and the surface 17 of the housing is kept relatively free from collection of foreign matter, the scrappage being directed to the outlet openings 18 for discharge from the housing.

I claim:

1. A brake mechanism comprising an annular rotatable housing having axially spaced walls and an interconnecting wall, braking members positioned between said spaced walls and relatively movable to respectively engage the internal surfaces of said walls thereby to brake said housing, and a rigid scraper for the internal surface of said interconnecting wall supported by said housing on the last mentioned surface and restrained against rotation with the housing by at least one of said braking members, said housing having a discharge opening.

2. A brake mechanism comprising an annular rotatable housing having axially spaced walls and an interconnecting wall, braking members positioned between said spaced walls and relatively movable to respectively engage the internal surfaces of said walls thereby to brake said housing, each braking member having a recess registering with the recess of the other member, and a scraper for the internal surface of said interconnecting wall floating in said recesses and restrained therein against rotation with the housing, said housing having a discharge opening.

3. A brake mechanism comprising an annular rotatable housing having axially spaced walls and an interconnecting wall, braking members positioned between said spaced walls and relatively movable to respectively engage the internal surfaces of said opposed walls thereby to brake said housing, each of said members having a periphery adjacent the internal surface of said connecting wall and a recess in its said periphery, and a rigid scraper for the last mentioned internal surface supported by the housing on said last mentioned surface and extending into said recesses for restraint therein against rotation with said housing, said interconnecting wall having a discharge opening.

4. A brake mechanism comprising an annular rotatable housing having axially spaced walls and an interconnecting wall, braking members positioned between said spaced walls and relatively movable to respectively engage the internal surfaces of said opposed walls thereby to brake said housing, each of said members having a periphery adjacent the internal surface of said connecting wall and a recess in its said periphery, and a rigid scraper for the last mentioned internal surface supported by the housing on said last mentioned surface and extending into said recesses for restraint therein against rotation with said housing, said interconnecting wall having openings therein respectively leading from the axially opposite extremities of the internal surface thereof for accommodating discharge of scrappage from the housing.

5. A brake mechanism comprising an annular rotatable housing having axially spaced walls and an interconnecting wall, braking members positioned between said spaced walls and relatively movable to respectively engage the internal surfaces of said opposed walls thereby to brake said housing, each of said members having a periphery adjacent the internal surface of said connecting wall and a recess in its said periphery, and a rigid scraper for the last mentioned internal surface supported by said housing on said last mentioned surface and extending into said recesses with clearance therein accommodating said relative movement of said braking members, the walls of said recess cooperating with said scraper to limit rotation of the scraper with the housing, said housing having a discharge opening therein.

6. A brake mechanism comprising an annular rotatable housing having axially spaced walls, braking members between said spaced walls and relatively movable to respectively frictionally engage the internal surfaces of said walls thereby to brake said housing, said housing including an internal surface radially outwardly from the frictionally engaged surfaces of said walls and said braking members and to which particles eroded by said frictional engagement are propelled by centrifugal force induced by rotation of said housing, said housing having openings therein respectively leading from the axially opposite extremities of said radially outward internal surface, and a rigid scraper for the last mentioned surface supported thereon and restrained against rotation with said housing by at least one of said braking members, said scraper having a periphery contoured to direct scrappage from such surface to said openings.

References Cited in the file of this patent

UNITED STATES PATENTS

| | | |
|---|---|---|
| 2,496,699 | Clark | Feb. 7, 1950 |
| 2,595,859 | Lambert et al. | May 6, 1952 |